(12) United States Patent
Tomitsuka (10) Patent No.: US 11,509,349 B2
(45) Date of Patent: Nov. 22, 2022

(54) RECEPTION DEVICE, WIRELESS COMMUNICATION SYSTEM, INTERFERENCE-POWER ESTIMATION METHOD, CONTROL CIRCUIT, AND RECORDING MEDIUM

(71) Applicant: Mitsubishi Electric Corporation, Tokyo (JP)

(72) Inventor: Koji Tomitsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/393,675

(22) Filed: Aug. 4, 2021

(65) Prior Publication Data

US 2021/0367639 A1 Nov. 25, 2021

Related U.S. Application Data

(63) Continuation of application No. PCT/JP2019/009474, filed on Mar. 8, 2019.

(51) Int. Cl.
*H04B 1/7107* (2011.01)
*H04B 1/04* (2006.01)
*H04B 17/345* (2015.01)

(52) U.S. Cl.
CPC ......... *H04B 1/7107* (2013.01); *H04B 1/0475* (2013.01); *H04B 17/345* (2015.01)

(58) Field of Classification Search
CPC .. H04B 1/1027; H04B 1/7097; H04B 1/7107; H04B 17/345; H04B 17/336; H04B 1/0475; H04J 11/0023
See application file for complete search history.

(56) References Cited

U.S. PATENT DOCUMENTS

2003/0153277 A1 8/2003 Ito et al.
2010/0048151 A1* 2/2010 Hara .................. H04L 5/0048
455/115.1
2012/0314824 A1* 12/2012 Fujimura ............. H04B 1/1036
375/350

(Continued)

FOREIGN PATENT DOCUMENTS

JP 3973017 B2 9/2007

*Primary Examiner* — Aristocratis Fotakis
(74) *Attorney, Agent, or Firm* — Birch, Stewart, Kolasch & Birch, LLP (57) ABSTRACT

A reception device includes an interference cancellation unit to extract a symbol from a received signal with a first signal inserted in a time direction of a data symbol, the symbol being a signal during an interval corresponding to the first signal, to reproduce an interference signal during an interval corresponding to the data symbol, and to output a first interference-cancelled signal obtained by extracting the data symbol from a signal obtained by cancelling the interference signal from the received signal, and an interference-power estimation unit to estimate desired signal power by subtracting second average power of a symbol of a first signal, extracted from the received signal, from first average power the data symbol to estimate first noise power by subtracting the desired signal power from third average power of the data symbol, to estimate second noise power from the first noise power, and to estimate interference power by subtracting the second noise power from the second average power.

13 Claims, 9 Drawing Sheets

(56) References Cited

U.S. PATENT DOCUMENTS

| | | | |
|---|---|---|---|
| 2016/0241351 A1* | 8/2016 | Suzuki | H04L 27/2691 |
| 2016/0380797 A1* | 12/2016 | Rahman | H04L 25/03343 375/260 |
| 2017/0085334 A1* | 3/2017 | Ishioka | H04L 27/2605 |
| 2018/0054343 A1* | 2/2018 | Suzuki | H04L 5/008 |

* cited by examiner

RECEPTION DEVICE, WIRELESS COMMUNICATION SYSTEM, INTERFERENCE-POWER ESTIMATION METHOD, CONTROL CIRCUIT, AND RECORDING MEDIUM

CROSS-REFERENCE TO RELATED APPLICATION

This application is a continuation application of International Application PCT/JP2019/009474, filed on Mar. 8, 2019, and designating the U.S., the entire contents of which are incorporated herein by reference.

BACKGROUND OF THE INVENTION

1. Field of the Invention

The disclosure relates to a reception device, a wireless communication system, an interference-power estimation method, control circuit, and recording medium to estimate interference power in wireless communication.

2. Description of the Related Art

In a wireless communication system formed of a transmission device and a reception device, when an interference signal is present within the same frequency band as a desired signal, the reception error rate performance is degraded due to the influence of the interference signal. Conventionally, countermeasures to the interference signal, such as spread spectrum communication, an interference canceller method, transmission power control, or adaptive modulation control, are carried out to control the communication method, transmission power, or the like according to the degree of influence of interference so as to improve the interference resistance.

For example, Japanese Patent No. 3973017 discloses a technique for a CDMA (Code Division Multiple Access) system that is a typical method for the spread spectrum communication. In the CDMA system, a reception device estimates an SIR (Signal to Interference power Ratio) of a received signal, and a transmission device controls transmission power on the basis of the result of the estimation to increase the channel capacity even under co-channel interference. As countermeasures to reduce the influence of an interference signal, estimation of interference power is an essential technique.

In the interference canceller method in which a replica of an interference signal is generated to cancel interference, it is necessary to accurately know the magnitude of interference power in order to precisely generate a replica of an interference signal included in a received signal. In the interference canceller method, it is an important technique to separate a desired signal and noise from the received signal to accurately estimate only the interference power.

According to the technique described in Japanese Patent No. 3973017, the transmission device transmits a pilot signal that is a known signal. The reception device uses the pilot signal included in the received signal to define average correlation power of a pilot pattern as desired signal power, and subtracts the desired signal power from average received power of the received signal to calculate residual power as an estimated interference-power value. However, the residual power includes noise power in addition to the interference power. There is thus a problem that the reception device described in Japanese Patent No. 3973017 cannot accurately estimate the interference power when the magnitude of noise power is significant relative to the interference power.

The present disclosure has been achieved to solve the above problems, and an object of the present disclosure is to provide a reception device that makes it possible to improve precision in estimating interference power of an interference signal included in a received signal.

SUMMARY OF THE INVENTION

In order to solve the above problems and achieve the object, a reception device according to the present disclosure comprises an interference cancellation unit to extract a symbol from a received signal with a first signal inserted in a time direction of a data symbol, the first signal being a signal with a value of amplitude smaller than that of the data symbol and the symbol being a signal during an interval corresponding to the first signal, to perform a signal interpolation process to reproduce an interference signal during an interval corresponding to the data symbol, and to output a first interference-cancelled signal obtained by extracting the data symbol from a signal obtained by cancelling the interference signal from the received signal. The reception device further comprises an interference-power estimation unit to estimate desired signal power by subtracting second average power of a symbol of a first signal, extracted from the received signal, from first average power of a data symbol extracted from the received signal, to estimate first noise power included in the first interference-cancelled signal by subtracting the desired signal power from third average power of a data symbol of the first interference-cancelled signal, to estimate second noise power included in the received signal from the first noise power, and to estimate interference power by subtracting the second noise power from the second average power.

DETAILED DESCRIPTION OF THE PREFERRED EMBODIMENTS

A reception device, a wireless communication system, and an interference-power estimation method according to embodiments of the present disclosure will be described in detail below with reference to the accompanying drawings.

Embodiment

Figure 1:
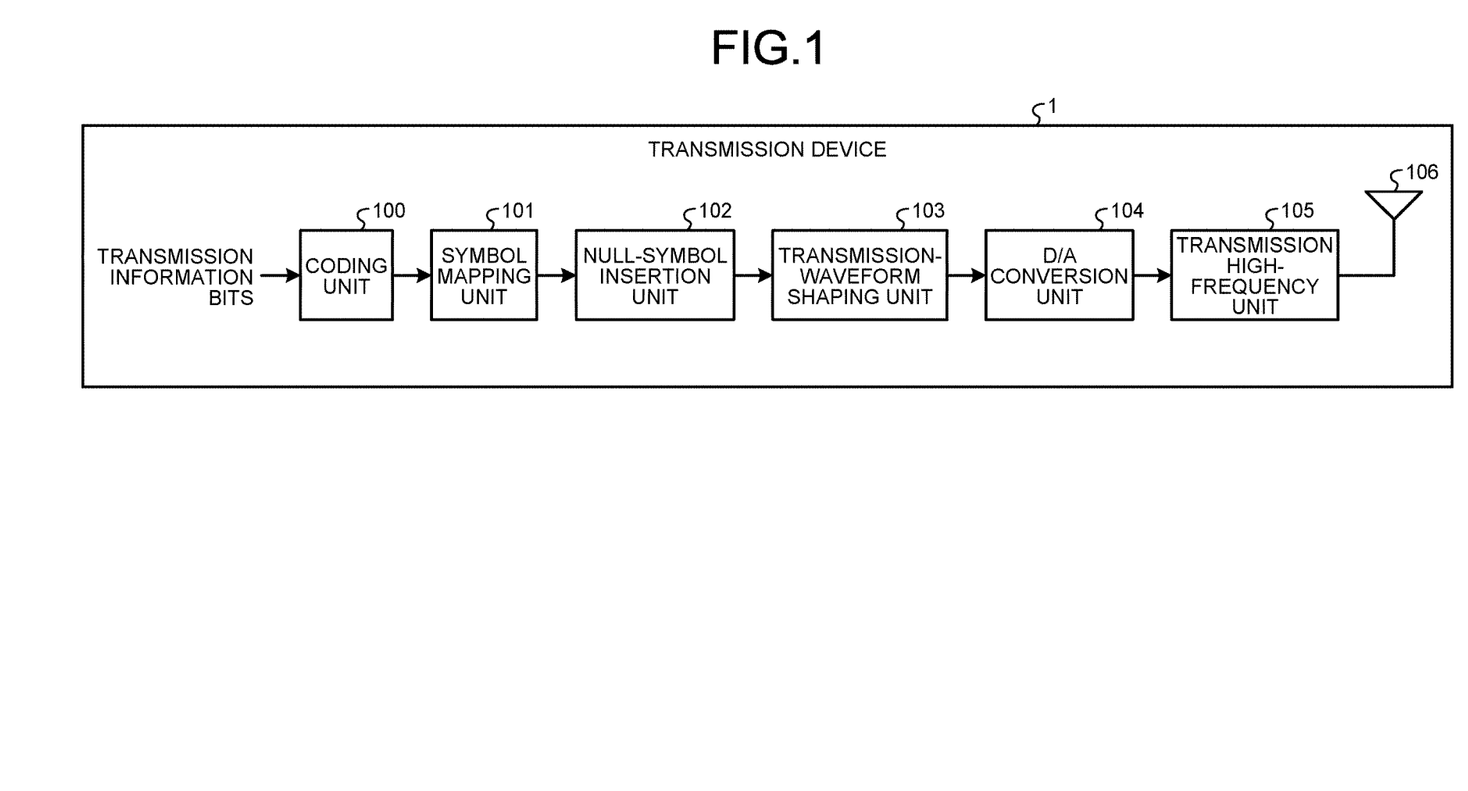
FIG. 1 is a block diagram illustrating a configuration example of a transmission device.

FIG. 1 is a block diagram illustrating a configuration example of a transmission device 1 according to an embodiment. The transmission device 1 and a reception device to be described later are separate devices. The transmission device 1 transmits a signal to the reception device to communicate with the reception device. The transmission device 1 includes a coding unit 100, a symbol mapping unit 101, a null-symbol insertion unit 102, a transmission-waveform shaping unit 103, a D/A (Digital/Analog) conversion unit 104, a transmission high-frequency unit 105, and an antenna 106.

The coding unit 100 performs error correction coding on transmission information bits, and outputs the transmission information bits as a transmission bit sequence. Examples of the error correction coding include convolutional coding, turbo coding, and LDPC (Low Density Parity Check code). However, the error correction coding is not limited thereto. The transmission device 1 may not be configured to perform error correction coding.

The symbol mapping unit 101 performs primary modulation on a transmission bit sequence having undergone error correction coding in the coding unit 100 to convert the transmission bit sequence to a transmission symbol sequence. Examples of the modulation method for primary modulation include PSK (Phase Shift Keying), FSK (Frequency Shift Keying), and QAM (Quadrature Amplitude Modulation). However, the modulation method is not limited thereto.

The null-symbol insertion unit 102 inserts a null symbol into the transmission symbol sequence. The null symbol is a signal whose amplitude is 0. An operation of the null-symbol insertion unit 102 is described later in detail.

The transmission-waveform shaping unit 103 performs up-sampling on the transmission symbol sequence. The transmission-waveform shaping unit 103 imposes band limitations on the transmission symbol sequence to generate a digital transmission signal that is a baseband signal or an IF (Intermediate Frequency) signal. A band-limiting filter that is used by the transmission-waveform shaping unit 103 to impose band limitations on the transmission symbol sequence is not limited to a particular type of filter. However, it is effective to employ the Nyquist filter as the band-limiting filter since the Nyquist filter can reduce leakage of a transmission signal component at the Nyquist point during the null symbol interval.

The D/A conversion unit 104 converts the digital transmission signal to an analog transmission signal. The transmission high-frequency unit 105 converts the analog transmission signal having undergone D/A conversion in the D/A conversion unit 104 to a radio frequency signal. The antenna 106 transmits the radio frequency signal. In the transmission device 1, the transmission processes in its constituent elements except the null-symbol insertion unit 102 are common transmission processes to be performed by a general wireless transmission device, and are not particularly limited.

Figure 2:
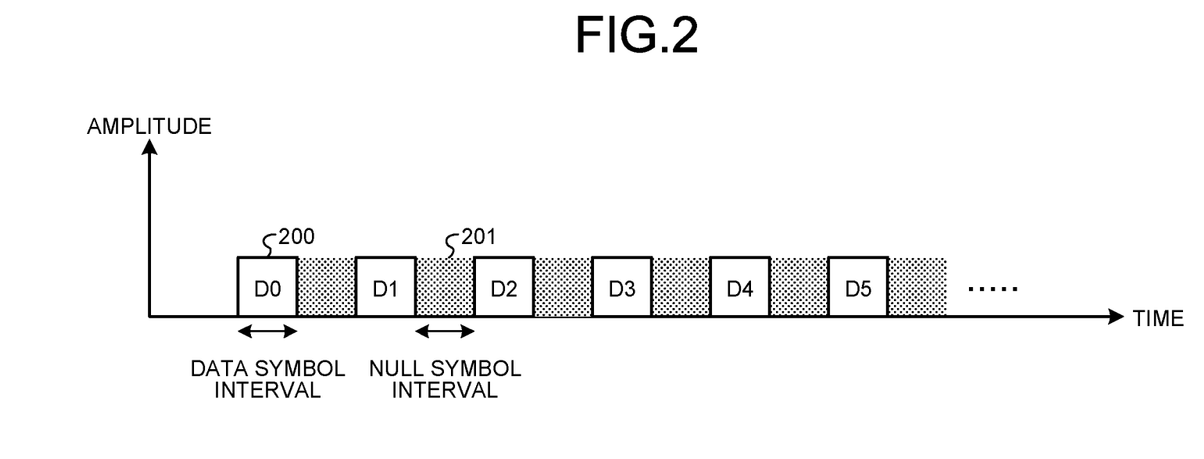
FIG. 2 is a diagram illustrating an example of a transmission symbol sequence output by a null-symbol insertion unit.

The operation of the null-symbol insertion unit 102 is now described in detail. FIG. 2 is a diagram illustrating an example of the transmission symbol sequence output by the null-symbol insertion unit 102 according to the present embodiment. In FIG. 2, the horizontal axis represents the time, and the vertical axis represents the amplitude of a signal. In FIG. 2, each of D0 to D5 indicates a data symbol 200. As illustrated in FIG. 2, the null-symbol insertion unit 102 inserts a null symbol 201 in a null symbol interval provided between data symbol intervals during which the transmission symbol sequence, that is, data symbols 200 are mapped. FIG. 2 illustrates an example in which the null-symbol insertion unit 102 has inserted a single null symbol 201 between adjacent data symbols 200. However, null symbols 201 are inserted at any intervals. It is allowable that a single null symbol interval is provided per plural data symbol intervals. The null symbols 201 are not necessarily inserted into the data symbols 200 at equal intervals.

The null-symbol insertion unit 102 adjusts the intervals at which the null symbols 201 are inserted, and thus can optionally adjust the null insertion rate to the transmission symbol sequence. As the null symbols 201 are inserted at shorter intervals, the reception device to be described later has a greater effect on increasing the sampling rate for sampling an interference signal that is present in the null symbol interval. This makes it possible to sample an interference signal within a wider band. In this manner, the transmission device 1 transmits, to the reception device, a signal with the null symbols 201 inserted in the time direction of the data symbols 200 by the null-symbol insertion unit 102. It is allowable that the transmission device 1 gives notice to the reception device by adding transmission data with control information indicating insertion positions of the null symbols 201. It is also allowable that the transmission device 1 and the reception device define rules for inserting the null symbols 201 in advance. Due to this operation, the transmission device 1 can eliminate the control information indicating the insertion positions of the null symbols 201.

Figure 3:
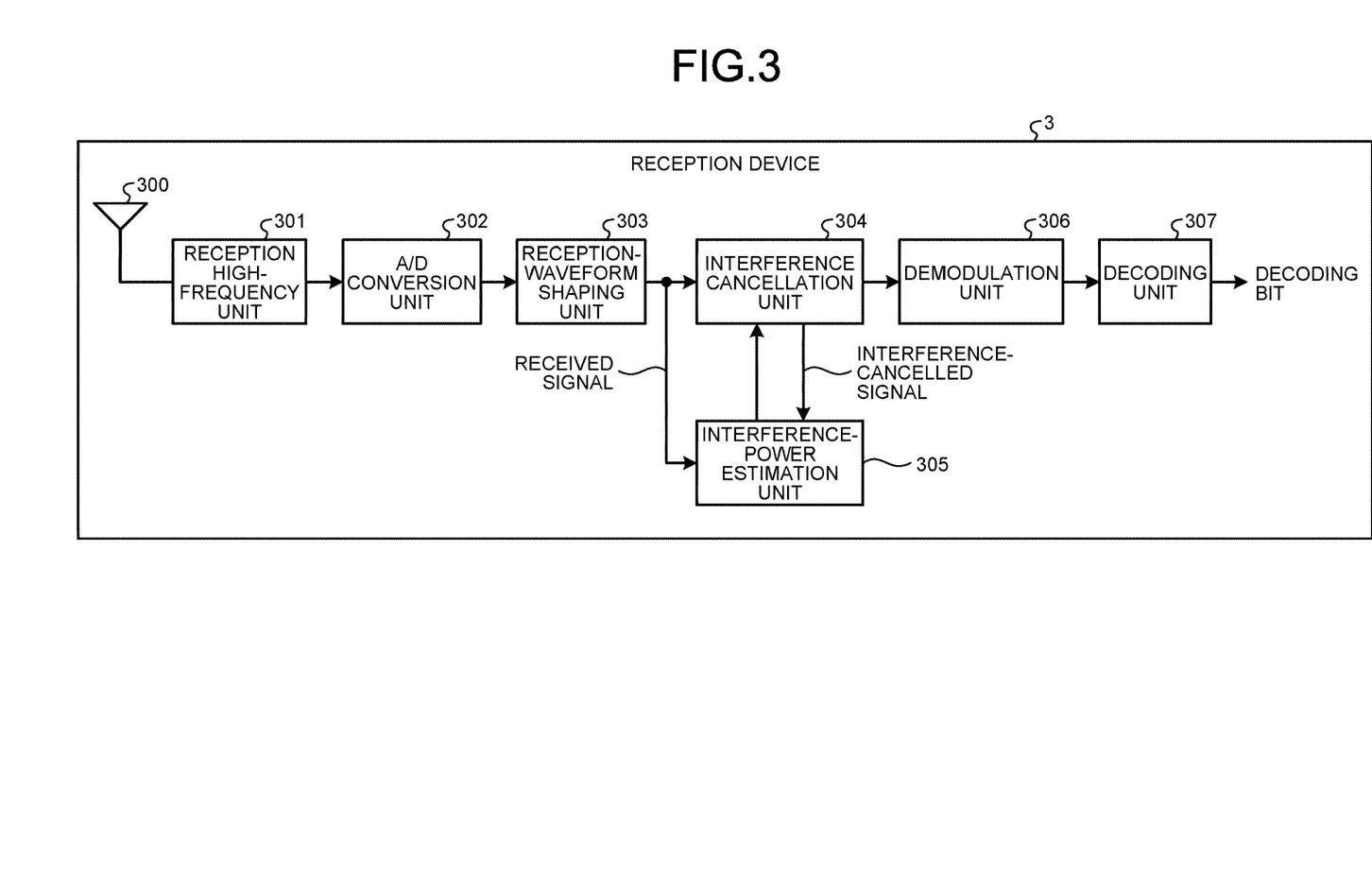
FIG. 3 is a block diagram illustrating a configuration example of a reception device.

A configuration and an operation of the reception device that communicates with the transmission device 1 is now described. FIG. 3 is a block diagram illustrating a configuration example of a reception device 3 according to the present embodiment. The reception device 3 includes an antenna 300, a reception high-frequency unit 301, an A/D (Analog/Digital) conversion unit 302, a reception-waveform shaping unit 303, an interference cancellation unit 304, an interference-power estimation unit 305, a demodulation unit 306, and a decoding unit 307.

The antenna 300 receives a radio frequency signal. The radio frequency signal received by the antenna 300 includes a desired signal, an interference signal, and noise. The desired signal refers to the data symbols 200 described above and included in the transmission symbol sequence. The reception high-frequency unit 301 performs frequency conversion on the radio frequency signal received by the antenna 300 to be converted to an analog signal that is an IF signal or a baseband signal. The A/D conversion unit 302 converts the analog signal to a digital signal. The reception-waveform shaping unit 303 imposes band limitations on the digital signal to cancel noise that falls outside of the frequency band of the desired signal.

The interference cancellation unit 304 reproduces an interference signal from a received signal that is the digital signal on which the reception-waveform shaping unit 303 has imposed band limitations, and then cancels the interference signal from the received signal. The interference cancellation unit 304 outputs data symbols that are an interference-cancelled signal obtained by cancelling the interference signal from the received signal. A configuration and an operation of the interference cancellation unit 304 is described later in detail.

The interference-power estimation unit 305 estimates desired signal power that is power of a desired signal and noise power that is power of noise by using a received signal and an interference-cancelled signal output from the interference cancellation unit 304. The received signal is a signal input to the interference cancellation unit 304, that is, a digital signal on which the reception-waveform shaping unit 303 has imposed band limitations. The interference-power estimation unit 305 then estimates interference power that is power of the interference signal included in the received signal. A configuration and an operation of the interference-power estimation unit 305 is described later in detail.

The demodulation unit 306 performs a demodulation process on the data symbols that are the interference-cancelled signal, and outputs the result of the demodulation that is a demapping result used for error correction decoding. The decoding unit 307 performs error correction decoding on the result of the demodulation that is the demapping result, and outputs decoded bits as the result of the decoding. In the reception device 3, the reception processes in its constituent elements except the interference cancellation unit 304 and the interference-power estimation unit 305 are common reception processes to be performed by a general wireless reception device, and are not particularly limited.

Figure 4:
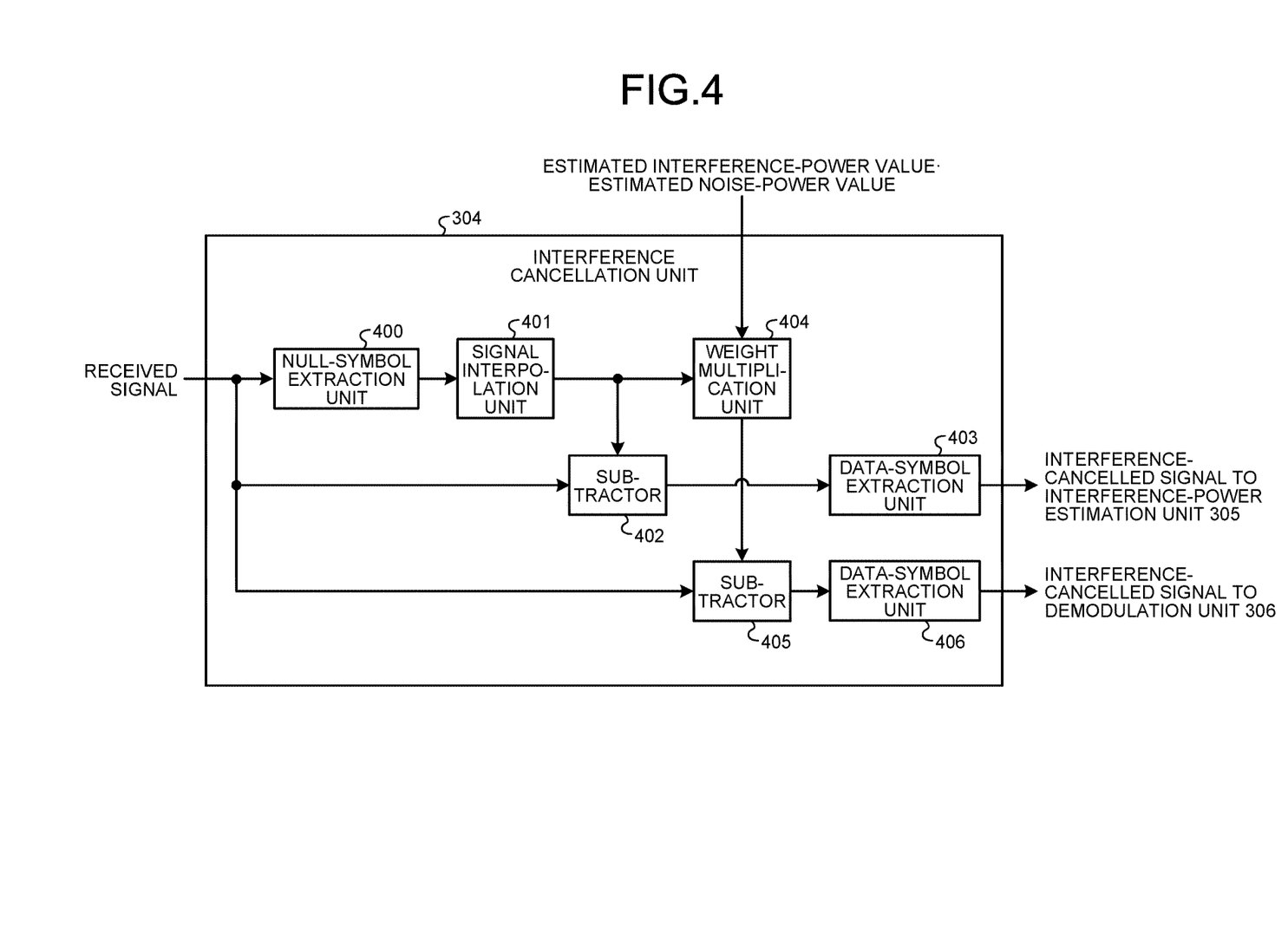
FIG. 4 is a block diagram illustrating a configuration example of an interference cancellation unit.

Subsequently, the configuration and the operation of the interference cancellation unit 304 is described in detail. FIG. 4 is a block diagram illustrating a configuration example of the interference cancellation unit 304 according to the present embodiment. The interference cancellation unit 304 includes a null-symbol extraction unit 400, a signal interpolation unit 401, a subtractor 402, a data-symbol extraction unit 403, a weight multiplication unit 404, a subtractor 405, and a data-symbol extraction unit 406.

The null-symbol extraction unit 400 extracts null symbols having been inserted by the null-symbol insertion unit 102 in the transmission device 1. The signal interpolation unit 401 performs a signal interpolation process of interpolating a signal between signals of the null symbols extracted by the null-symbol extraction unit 400 to reproduce an interference signal during the data symbol interval. The signal interpolation unit 401 outputs the reproduced interference signal as an interference replica.

The subtractor 402 subtracts the interference signal during the data symbol interval, which has been reproduced by the signal interpolation unit 401, from the received signal obtained from the reception-waveform shaping unit 303 to cancel the interference signal from the received signal. The data-symbol extraction unit 403 extracts data symbols from the received signal with the interference signal cancelled by the subtractor 402, and outputs the extracted data symbols as an interference-cancelled signal to the interference-power estimation unit 305. The interference-cancelled signal output by the data-symbol extraction unit 403 is sometimes referred to as "first interference-cancelled signal".

The weight multiplication unit 404 calculates a weight coefficient on the basis of information on the ratio between an estimated interference-power value and an estimated noise-power value which are both estimated by the interference-power estimation unit 305. The weight multiplication unit 404 multiplies the interference replica reproduced by the signal interpolation unit 401 by the calculated weight coefficient and outputs the result of the multiplication. For example, where the estimated interference-power value is represented as $P_I$, and the estimated noise-power value is represented as $\sigma^2$, the weight multiplication unit 404 can calculate a weight coefficient α as expressed by the following equation (1).

$$\alpha = P_I/(P_I + \beta \cdot \sigma^2) \qquad (1)$$

In this equation (1), the estimated noise-power value $\sigma^2$ represents noise power included within the bandwidth of a desired signal. β is a coefficient for converting the estimated noise-power value $\sigma^2$ to noise power for the bandwidth of the interference signal. The value of β is set to be a real number. The weight coefficient α is set properly, so that the reception device 3 can maximize a CINR (Carrier power to Interference plus Noise power Ratio) of the interference-cancelled signal obtained by cancelling the interference signal from the received signal. In order that the reception device 3 correctly sets the weight coefficient α designed to improve the interference cancellation performance, it is necessary to know interference power of an interference signal included in a received signal, and noise power of noise included in the received signal, as expressed by the equation (1). A method for estimating the interference power and the noise power according to the present embodiment is described later in detail.

The subtractor 405 cancels the interference signal by subtracting a signal, obtained by multiplying the interference replica by the weight coefficient α in the weight multiplication unit 404, from the received signal obtained from the reception-waveform shaping unit 303. The data-symbol extraction unit 406 extracts data symbols from the received signal with the interference signal cancelled by the subtractor 405, and outputs the extracted data symbols as an interference-cancelled signal to the demodulation unit 306. The interference-cancelled signal output by the data-symbol extraction unit 406 is sometimes referred to as "second interference-cancelled signal".

Figure 5:
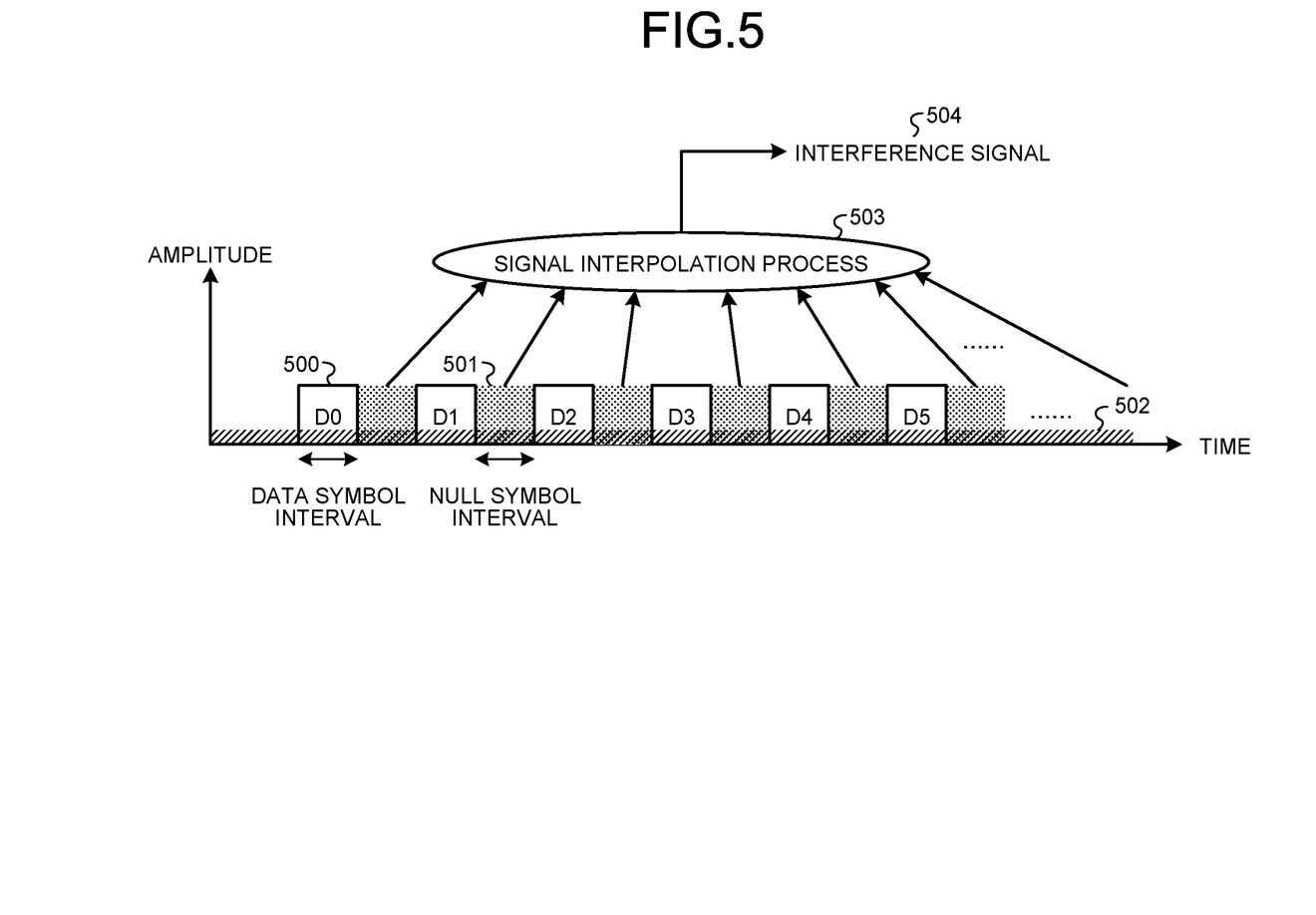
FIG. 5 is a diagram illustrating an example of a signal interpolation process performed by a signal interpolation unit in the interference cancellation unit.

FIG. 5 is a diagram illustrating an example of the signal interpolation process performed by the signal interpolation unit 401 in the interference cancellation unit 304 according to the present embodiment. In FIG. 5, the horizontal axis represents the time, and the vertical axis represents the amplitude of a signal. FIG. 5 illustrates a received signal that is a received symbol sequence obtained from the reception-waveform shaping unit 303. In FIG. 5, each of D0 to D5 indicates a data symbol 500. The data symbol 500 is a symbol during a data symbol interval. A null symbol 501 is a symbol during a null symbol interval provided between the data symbol intervals. An interference signal 502 is a signal in which an interference signal is combined with noise generated in the reception device 3. A signal interpolation process 503 is an image of the signal interpolation process in the signal interpolation unit 401. An interference signal 504 is an image of the interference replica output from the signal interpolation unit 401, that is, an interference signal reproduced by the signal interpolation unit 401. As illustrated in FIG. 5, a received signal is separated into the data symbols 500 that are a desired signal and the null symbols 501 inserted by the null-symbol insertion unit 102 in the transmission device 1. The received signal also includes an interference signal and the interference signal 502 generated in the reception device 3 in addition to the desired signal. The null symbol is also referred to as "first symbol".

The null-symbol extraction unit 400 extracts only the null symbols 501 from the received signal obtained from the reception-waveform shaping unit 303, and discards the data symbols 500. The signal interpolation unit 401 performs a signal interpolation process on the null symbols extracted by the null-symbol extraction unit 400 to reproduce an interference signal during the data symbol interval. The signal interpolation process in the signal interpolation unit 401 is not limited to a particular method. For example, there is a method using an FIR (Finite Impulse Response) filter for the signal interpolation process. It is also allowable that the signal interpolation unit 401 uses a method of filtering in a frequency domain by using DFT (Discrete Fourier Transform) and IDFT (Inverse Discrete Fourier Transform) or FFT (Fast Fourier Transform) and IFFT (Inverse Fast Fourier Transform). Whichever method is used for the signal interpolation process, the signal interpolation unit 401 sets the frequency passband of an interpolation filter to a band within which interference is included, and can thereby reduce the influence of noise and effectively reproduce an interference signal. Estimation of the band within which interference is included is not limited to a particular method. For example, it is allowable that the signal interpolation unit 401 observes the distribution of power at each frequency in a converted frequency-domain signal, and compares the distribution of power with an average power-based threshold to determine the frequency, at which the power is relatively high, to be a band within which interference is included.

Figure 6:
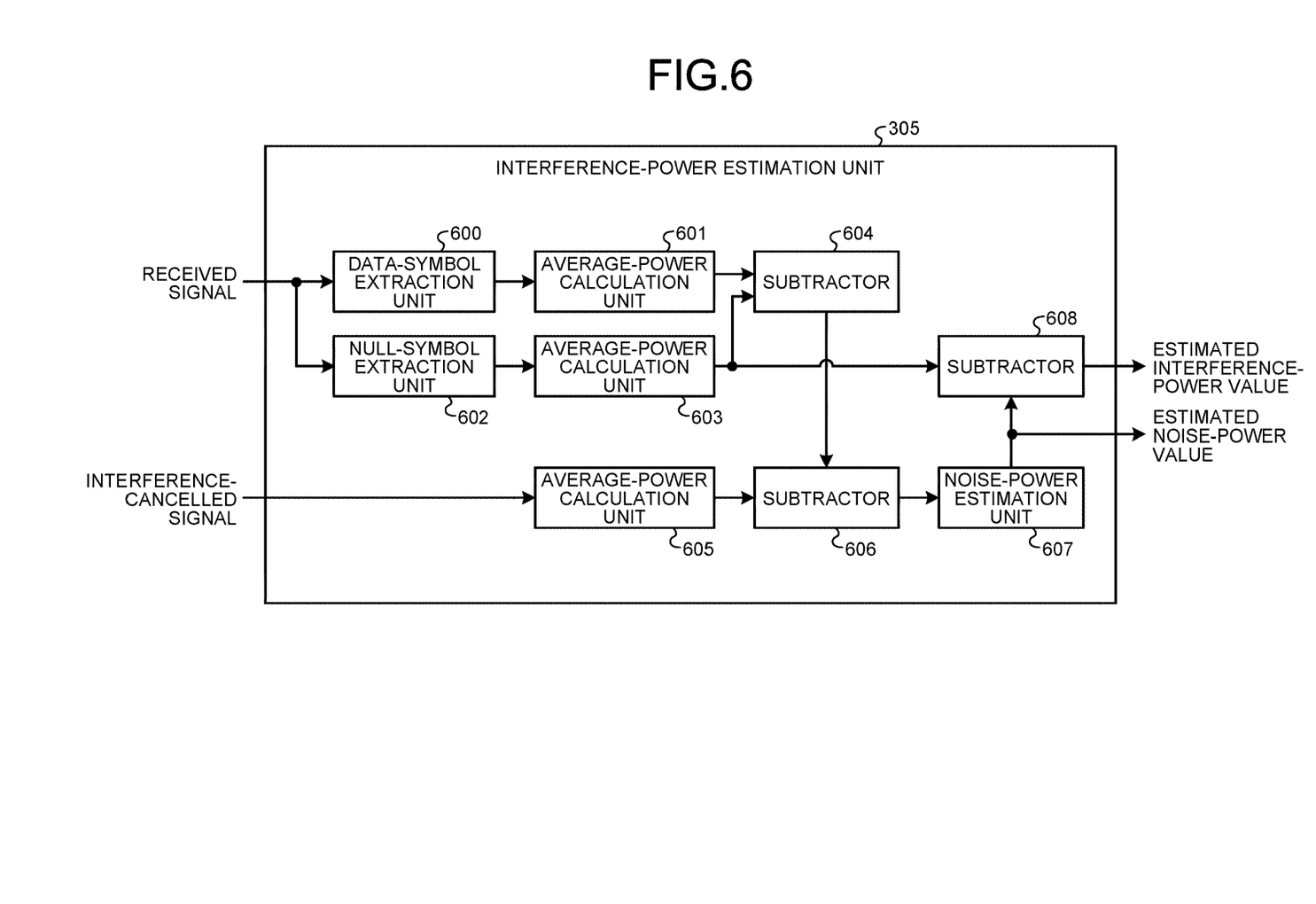
FIG. 6 is a block diagram illustrating a configuration example of an interference-power estimation unit.

Next, the configuration and the operation of the interference-power estimation unit 305 is described in detail. FIG. 6 is a block diagram illustrating a configuration example of the interference-power estimation unit 305 according to the present embodiment. The interference-power estimation unit 305 includes a data-symbol extraction unit 600, an average-power calculation unit 601, a null-symbol extraction unit 602, an average-power calculation unit 603, a subtractor 604, an average-power calculation unit 605, a subtractor 606, a noise-power estimation unit 607, and a subtractor 608.

The data-symbol extraction unit 600 extracts data symbols of a transmission symbol sequence, generated by the symbol mapping unit 101 in the transmission device 1, from a received signal obtained from the reception-waveform shaping unit 303. The average-power calculation unit 601 calculates average power of the data symbols extracted by the data-symbol extraction unit 600. The average power of the data symbols calculated by the average-power calculation unit 601 is sometimes referred to as "first average power".

The null-symbol extraction unit 602 extracts null symbols, having been inserted by the null-symbol insertion unit 102 in the transmission device 1, from the received signal obtained from the reception-waveform shaping unit 303. The average-power calculation unit 603 calculates average power of the null symbols extracted by the null-symbol extraction unit 602. The average power of the null symbols calculated by the average-power calculation unit 603 is sometimes referred to as "second average power".

The subtractor 604 calculates an estimated value of desired signal power by subtracting the average power of the null symbols, calculated by the average-power calculation unit 603, from the average power of the data symbols calculated by the average-power calculation unit 601. The subtractor 604 outputs the estimated desired-signal-power value calculated. Where the average power of the data symbols calculated by the average-power calculation unit 601 is represented as $P_{DATA}$, and the average power of the null symbols calculated by the average-power calculation unit 603 is represented as $P_{NULL}$, the subtractor 604 can calculate an estimated desired-signal-power value $P_D$ as expressed by the following equation (2).

$$P_D = P_{DATA} - P_{NULL} \quad (2)$$

In this equation (2), the average power $P_{DATA}$ of the data symbols is the total of power combining desired signal power, interference power, and noise power. In contrast, the average power $P_{NULL}$ of the null symbols is the total of power combining interference power and noise power. As described above, the average power $P_{NULL}$ of the null symbols does not include the desired signal power. Thus, the subtractor 604 can estimate the estimated desired-signal-power value $P_D$ by calculating the difference between the average power $P_{DATA}$ of the data symbols and the average power $P_{NULL}$ of the null symbols.

The average-power calculation unit 605 calculates average power of the interference-cancelled signal obtained from the data-symbol extraction unit 403 in the interference cancellation unit 304. The average power of the interference-cancelled signal calculated by the average-power calculation unit 605 is sometimes referred to as "third average power". The average power of the interference-cancelled signal calculated by the average-power calculation unit 605 is represented as $P_{IC}$. The interference-cancelled signal is a signal obtained after an interference signal has been cancelled from a received signal. The interference-cancelled signal includes, in addition to a desired signal and noise, another noise included in an interference replica used at the time of interference cancellation. Hereinafter, power of the original received-signal noise included in a received signal is defined as received-signal noise power, and the received-signal noise power and power of noise, which is mixed in at the time of interference cancellation using an interference replica, are combined and defined as residual noise power.

The subtractor 606 calculates an estimated residual-noise-power value $\sigma_{IC}^2$ by subtracting the estimated desired-signal-power value $P_D$ calculated by the subtractor 604 from the average power $P_{IC}$ of the interference-cancelled signal calculated by the average-power calculation unit 605, that is, the total of power combining the desired signal power and the residual noise power. The estimated residual-noise-power value $\sigma_{IC}^2$ calculated by the subtractor 606 is sometimes referred to as "first noise power". The subtractor 606 can calculate the estimated residual-noise-power value $\sigma_{IC}^2$ as expressed by the following equation (3).

$$\sigma_{IC}^2 = P_{IC} - P_D \quad (3)$$

The noise-power estimation unit 607 estimates the estimated noise-power value $\sigma^2$ by removing the noise added at the time of interference cancellation using an interference replica from the residual noise power. A relation between the estimated residual-noise-power value $\sigma_{IC}^2$ and the estimated noise-power value $\sigma^2$ can be expressed by the following equation (4).

$$\sigma^2 = (1/\gamma) \cdot \sigma_{IC}^2 \quad (4)$$

The weight coefficient α expressed in the equation (1) is dependent on the power ratio between an input signal and an output signal when the signal interpolation unit 401 that generates an interference replica performs a signal interpolation process, that is, dependent on the output signal power/input signal power. For example, when the amplitude is adjusted in such a manner as not to change the average power of an input signal and an output signal of the signal interpolation unit 401, that is, when the output signal power/input signal power=1, the weight coefficient α is determined by the symbol insertion interval of the null symbols. That is, γ=2 when the transmission device 1 inserts the null symbols at intervals of two symbols, while γ=4 when the transmission device 1 inserts the null symbols at intervals of four symbols. When a gain value, that is, the output signal power/input signal power is other than 1, the symbol insertion interval of the null symbols in the transmission device 1 is multiplied by the power ratio between an input signal and an output signal, and a result of the multiplication is set as γ. That is, noise included in an interference replica generated by the signal interpolation process by the signal interpolation unit 401 is emphasized by the signal interpolation process. This means that the output signal is generated with noise power having been increased α-fold relative to noise power included in the input signal. By taking advantage of this characteristic, the noise-power estimation unit 607 can estimate the estimated noise-power value $\sigma^2$. The estimated noise-power value $\sigma^2$ estimated by the noise-power estimation unit 607 is sometimes referred to as "second noise power".

The subtractor 608 calculates the estimated interference-power value $P_I$ by subtracting the estimated noise-power value $\sigma^2$, calculated by the noise-power estimation unit 607, from the average power $P_{NULL}$ of the null symbols calculated by the average-power calculation unit 603. The subtractor 608 can calculate the estimated interference-power value $P_I$ as expressed by the following equation (5).

$$P_I = P_{NULL} - \sigma^2 \quad (5)$$

The average power $P_{NULL}$ of the null symbols is the total of power combining an interference signal and noise. Thus, the subtractor 608 can calculate the estimated interference-power value $P_I$ by calculating the difference between the average power $P_{NULL}$ of the null symbols and the estimated noise-power value $\sigma^2$.

Figure 7:
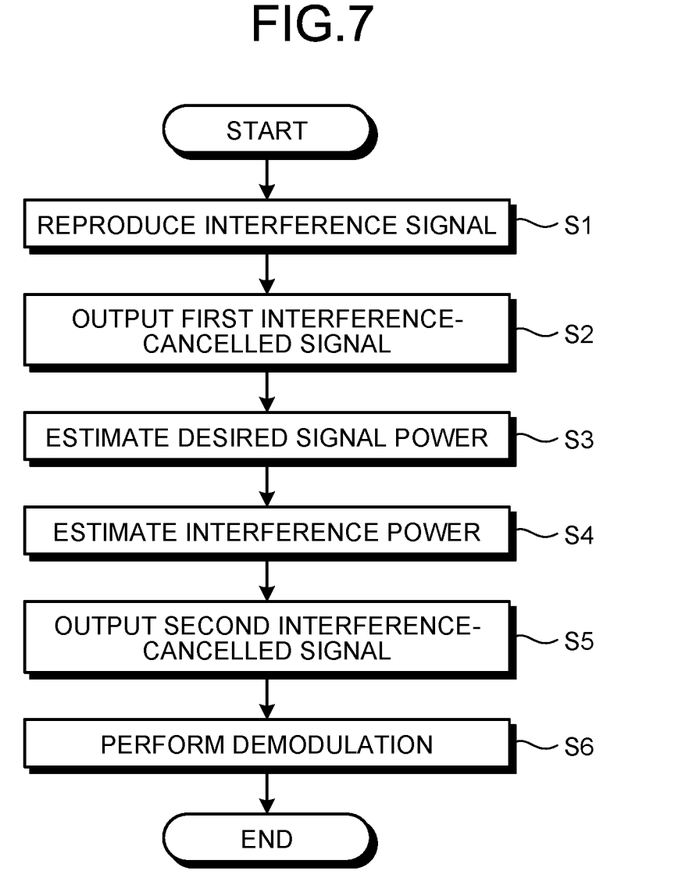
FIG. 7 is a flowchart illustrating an operation of the reception device.

The operation of the reception device 3 described above is explained below with reference to a flowchart. FIG. 7 is a flowchart illustrating the operation of the reception device 3 according to the present embodiment. Prior to the operation of the reception device 3, the transmission device 1 transmits a first signal inserted in the time direction of a data symbol. The first signal is a signal with a value of amplitude smaller than that of the data symbol. In the reception device 3, the interference cancellation unit 304 extracts a symbol from a received signal with a first signal inserted in the time direction of a data symbol. The first signal is a signal with a value of amplitude smaller than that of the data symbol. The symbol is a signal during an interval corresponding to the first signal. The interference cancellation unit 304 performs a signal interpolation process to reproduce an interference signal during an interval corresponding to the data symbol (Step S1). The interference cancellation unit 304 outputs a first interference-cancelled signal obtained by extracting the data symbol from a signal obtained by cancelling the interference signal from the received signal (Step S2).

The interference-power estimation unit 305 estimates desired signal power by subtracting second average power of a symbol of a first signal, extracted from the received signal, from first average power of a data symbol extracted from the received signal (Step S3). The interference-power estimation unit 305 estimates first noise power included in the first interference-cancelled signal by subtracting the desired signal power from third average power of a data symbol of the first interference-cancelled signal, and then estimates second noise power included in the received signal from the first noise power. The interference-power estimation unit 305 estimates interference power by subtracting the second noise power from the second average power (Step S4).

The interference cancellation unit 304 calculates a weight coefficient by using the interference power and the second noise power which are both estimated by the interference-power estimation unit 305. The interference cancellation unit 304 multiplies the interference signal by the weight coefficient, and outputs a second interference-cancelled signal obtained by extracting the data symbol from a signal obtained by cancelling the interference signal multiplied by the weight coefficient from the received signal (Step S5). The demodulation unit 306 performs demodulation on the second interference-cancelled signal (Step S6).

Subsequently, a hardware configuration of the reception device 3 is described. As described above, in the reception device 3, its constituent elements, except the interference cancellation unit 304 and the interference-power estimation unit 305, are implemented by a conventional hardware configuration to perform general reception processes. In the reception device 3, the interference cancellation unit 304 and the interference-power estimation unit 305 are implemented by a processing circuitry. It is allowable that the processing circuitry is either dedicated hardware, or a memory and a processor that executes programs stored in the memory.

Figure 8:
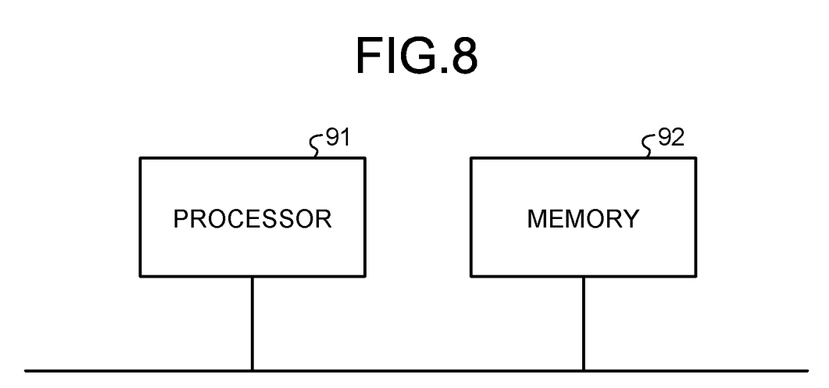
FIG. 8 is a diagram illustrating an example of a processing circuitry included in the reception device in a case where the processing circuitry is configured by a processor and a memory.

FIG. 8 is a diagram illustrating an example of the processing circuitry included in the reception device 3 according to the present embodiment in a case where the processing circuitry is configured by a processor and a memory. In a case where the processing circuitry is configured by a processor 91 and a memory 92, the functions of the processing circuitry of the reception device 3 are implemented in software, firmware, or a combination of the software and the firmware. The software or the firmware is described as a program and stored in the memory 92. In the processing circuitry, the processor 91 reads and executes the program stored in the memory 92 to thereby implement each of the functions. That is, the processing circuitry includes the memory 92 that stores therein programs that eventually execute the processing of the reception device 3. These programs are also regarded as causing a computer to execute the procedure and the method of the reception device 3.

The processor 91 may be a CPU (Central Processing Unit), a processing device, a computation device, a microprocessor, a microcomputer, a DSP (Digital Signal Processor), or the like. The memory 92 corresponds to a nonvolatile or volatile semiconductor memory such as a RAM (Random Access Memory), a ROM (Read Only Memory), a flash memory, an EPROM (Erasable Programmable ROM), an EEPROM (registered trademark) (Electrically EPROM), or the like, a magnetic disk, a flexible disk, an optical disk, a compact disk, a MiniDisk, a DVD (Digital Versatile Disc), or the like.

Figure 9:
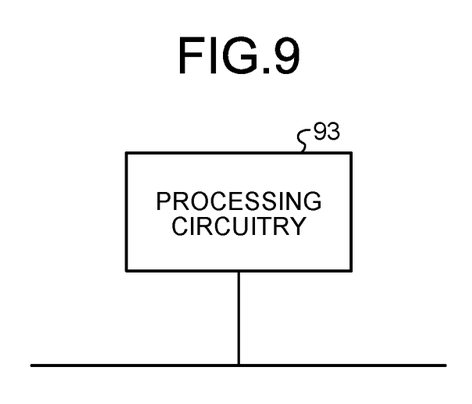
FIG. 9 is a diagram illustrating an example of a processing circuitry included in the reception device in a case where the processing circuitry is configured by dedicated hardware.

FIG. 9 is a diagram illustrating an example of a processing circuitry included in the reception device 3 according to the present embodiment in a case where the processing circuitry is configured by dedicated hardware. When the processing circuitry is configured by dedicated hardware, a processing circuitry 93 illustrated in FIG. 9 corresponds to, for example, a single circuit, a composite circuit, a programmed processor, a parallel programmed processor, an ASIC (Application Specific Integrated Circuit), an FPGA (Field Programmable Gate Array), or a combination thereof. Each of the functions of the reception device 3 may be implemented separately by the processing circuitry 93 according to the respective functions. Alternatively, the respective functions of the reception device 3 may be implemented collectively by the processing circuitry 93.

A part of the respective functions of the reception device 3 may be implemented by dedicated hardware, and other parts thereof may be implemented by software or firmware. In this manner, the processing circuitry can implement the above functions by dedicated hardware, software, firmware, or a combination thereof.

As explained above, in the present embodiment, the transmission device 1 inserts null symbols into a transmission symbol sequence. The reception device 3 performs a signal interpolation process on the basis of an interference signal present in the null symbols 501 to reproduce an interference signal during a data symbol interval. The reception device 3 cancels the interference signal included in the received signal on the basis of the reproduced interference signal during the data symbol interval. The reception device 3 estimates desired signal power by using the power difference between the data symbols 500 and the null symbols 501 from the received signal before interference is cancelled. The reception device 3 then estimates noise power from the received signal obtained after interference has been canceled, by taking advantage of the characteristic that the reception device 3 can predict the amount of increase in noise power between before and after cancellation of the interference by a signal interpolation process. Due to this operation, the reception device 3 separates only an interference signal from a received signal including a desired signal, the interference signal, and noise, and thus can precisely estimate interference power of the interference signal.

Since the reception device 3 accurately identifies the magnitude of interference power included in the received signal, precision in cancelling interference can be improved, and accordingly this can reduce degradation in the reception quality of a desired signal, for example, the bit error rate. The reception device 3 accurately estimates the interference power included in the received signal and cancels the interference signal to thereby improve the interference resistance, and consequently can achieve stable wireless communication in a radio wave propagation environment where unknown interference is present. The reception device 3 accurately estimates the interference power included in the received signal, and thus achieves improvement in precision in detecting whether an interference signal is present.

The reception device 3 can accurately measure a CNR (Carrier power to Noise Ratio), a CIR (Carrier power to Interference power Ratio), a CINR, or the like which can be used as an indicator of radio channel quality. Thus, the reception device 3 utilizes the measurement described above in adaptive modulation transmission, transmission power control, radio resource allocation control, or other control in response to the radio wave propagation environment, so that the reception device 3 can improve the interference resistance and consequently achieve stable wireless communication. Specifically, in the reception device 3, the interference-power estimation unit 305 can measure the CINR by using the desired signal power, the interference power, and the second noise power. The interference-power estimation unit 305 can also measure the CIR by using the desired signal power and the interference power. The interference-power estimation unit 305 can further measure the CNR by using the desired signal power and the second noise power.

In the present embodiment, the reception device 3 is configured to feed the estimated interference-power value and the estimated noise-power value which are both estimated by the interference-power estimation unit 305 back to the interference cancellation unit 304, and then use these estimated values to calculate the weight coefficient α to be multiplied with an interference replica, so as to improve the interference cancellation performance. However, the configuration of the reception device 3 is not limited thereto. In a case where the reception device 3 only intends to estimate interference power, or only intends to estimate the CNR, CIR, CINR, or the like by using estimated desired signal power, estimated interference power, and estimated noise power that are included in a received signal, the reception device 3 does not always need to perform the feedback to the interference cancellation unit 304. Similarly, in a case where the reception device 3 does not intend to cancel interference, the reception device 3 does not always need to output a received signal with an interference signal cancelled by the interference cancellation unit 304, that is, an interference-cancelled signal to the demodulation unit 306 at the subsequent stage.

In the present embodiment, the null symbol has been described as a signal whose amplitude is 0 merely as an example. The amplitude of the null symbol is not limited to 0, but the null symbol may be replaced with a signal whose amplitude is smaller than the amplitude of data symbols of a transmission symbol sequence generated by the symbol mapping unit 101. For example, the amplitude of the null symbol is equal to or smaller than 1/R of the amplitude of the transmission symbol sequence, where R is equal to or larger than 1. A signal whose amplitude is 0 or smaller than the amplitude of a transmission symbol sequence is defined as a first signal. It is allowable that the null symbol interval during which the null-symbol insertion unit 102 inserts a null symbol may be an interval during which the first signal is inserted instead of the null symbol.

Figure 10:
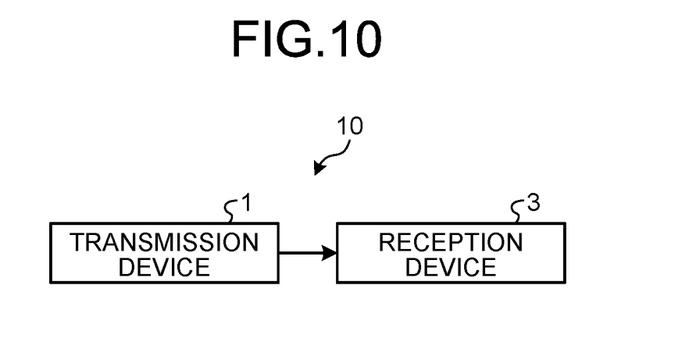
FIG. 10 is a diagram illustrating a configuration example of a wireless communication system including the transmission device and the reception device.
Figure 11:
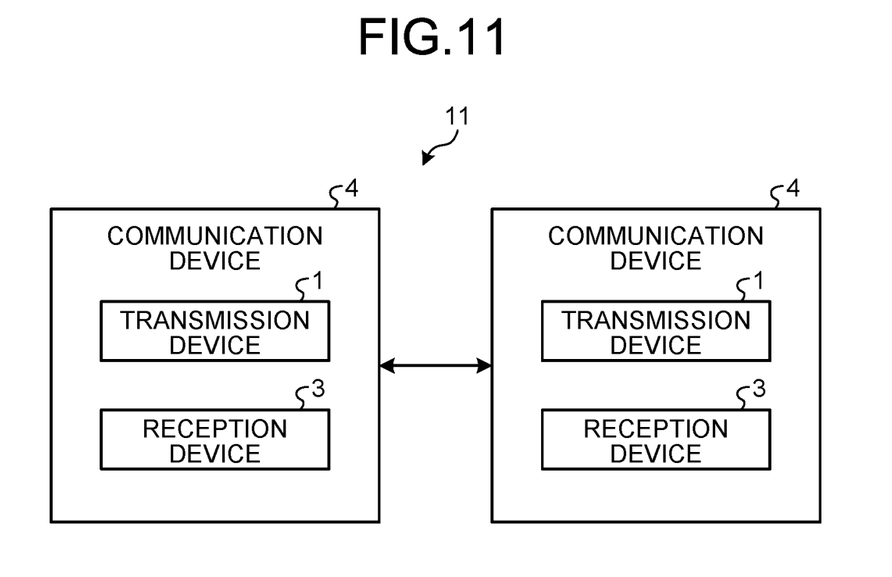
FIG. 11 is a diagram illustrating a configuration example of a wireless communication system including communication devices.

In the present embodiment, the wireless communication system has been described in which the transmission device 1 transmits a signal to the reception device 3 to communicate with the reception device 3. However, the disclosure is not limited thereto. The disclosure is also applicable to a wireless communication system in which a communication device including the transmission device 1 and the reception device 3 transmits/receives a signal bidirectionally to/from another communication device including the transmission device 1 and the reception device 3. FIG. 10 is a diagram illustrating a configuration example of a wireless communication system 10 including the transmission device 1 and the reception device 3 according to the present embodiment. The wireless communication system 10 includes the transmission device 1 and the reception device 3, in which the transmission device 1 transmits a signal to the reception device 3. FIG. 11 is a diagram illustrating a configuration example of a wireless communication system 11 including communication devices 4 according to the present embodiment. Each of the communication devices 4 includes the transmission device 1 and the reception device 3. In the wireless communication system 11, the communication devices 4 transmit/receive a signal to/from each other bidirectionally.

The reception device according to the present disclosure has an effect where it is possible to improve precision in estimating interference power of an interference signal included in a received signal.

The configurations described in the above embodiments are only examples. The configurations can be combined with other well-known techniques, and part of each of the configurations can be omitted or modified without departing from the gist.

What is claimed is:

1. A reception device comprising:
an interference cancellation circuitry to extract a symbol from a received signal with a first signal inserted in a time direction of a data symbol, the first signal being a signal with a value of amplitude smaller than that of the data symbol and the symbol being a signal during an interval corresponding to the first signal, to perform a signal interpolation process to reproduce an interference signal during an interval corresponding to the data symbol, and to output a first interference-cancelled signal obtained by extracting the data symbol from a signal obtained by cancelling the interference signal from the received signal; and
an interference-power estimation circuitry to estimate desired signal power by subtracting second average power of a symbol of a first signal, extracted from the received signal, from first average power of a data symbol extracted from the received signal, to estimate first noise power included in the first interference-cancelled signal by subtracting the desired signal power from third average power of a data symbol of the first interference-cancelled signal, to estimate second noise power included in the received signal from the first noise power, and to estimate interference power by subtracting the second noise power from the second average power.

2. The reception device according to claim 1, wherein
the interference cancellation circuitry calculates a weight coefficient by using the interference power and the second noise power which are both estimated by the interference-power estimation circuitry, multiplies the interference signal by the weight coefficient, and outputs a second interference-cancelled signal obtained by extracting the data symbol from a signal obtained by cancelling the interference signal multiplied by the weight coefficient from the received signal, and
the reception device further comprises a demodulation circuitry to perform a demodulation process on the second interference-cancelled signal.

3. The reception device according to claim 1, wherein the interference-power estimation circuitry measures a carrier power to interference plus noise power ratio by using the desired signal power, the interference power, and the second noise power.

4. The reception device according to claim 1, wherein the interference-power estimation circuitry measures a carrier power to interference power ratio by using the desired signal power and the interference power.

5. The reception device according to claim 1, wherein the interference-power estimation circuitry measures a carrier power to noise ratio by using the desired signal power and the second noise power.

6. A wireless communication system comprising:
a transmission device to transmit a first signal inserted in a time direction of a data symbol, the first signal being a signal with a value of amplitude smaller than that of the data symbol; and
the reception device according to claim 1.

7. An interference-power estimation method comprising:
by an interference cancellation circuitry, extracting a symbol from a received signal with a first signal inserted in a time direction of a data symbol, the first signal being a signal with a value of amplitude smaller than that of the data symbol and the symbol being a signal during an interval corresponding to the first signal, and performing a signal interpolation process to reproduce an interference signal during an interval corresponding to the data symbol;
by the interference cancellation circuitry, outputting a first interference-cancelled signal obtained by extracting the data symbol from a signal obtained by cancelling the interference signal from the received signal;
by an interference-power estimation circuitry, estimating desired signal power by subtracting second average power of a symbol of a first signal, extracted from the received signal, from first average power of a data symbol extracted from the received signal; and
by the interference-power estimation circuitry, estimating first noise power included in the first interference-cancelled signal by subtracting the desired signal power from third average power of a data symbol of the first interference-cancelled signal, estimating second noise power included in the received signal from the first noise power, and estimating interference power by subtracting the second noise power from the second average power.

8. The interference-power estimation method according to claim 7, comprising:
by the interference cancellation circuitry, calculating a weight coefficient by using the interference power and the second noise power which are both estimated by the interference-power estimation circuitry, multiplying the interference signal by the weight coefficient, and outputting a second interference-cancelled signal obtained by extracting the data symbol from a signal obtained by cancelling the interference signal multiplied by the weight coefficient from the received signal; and
performing, by a demodulation circuitry, demodulation on the second interference-cancelled signal.

9. The interference-power estimation method according to claim 7, comprising, by the interference-power estimation circuitry, measuring a carrier power to interference plus noise power ratio by using the desired signal power, the interference power, and the second noise power.

10. The interference-power estimation method according to claim 7, comprising, by the interference-power estimation circuitry, measuring a carrier power to interference power ratio by using the desired signal power and the interference power.

11. The interference-power estimation method according to claim 7, comprising, by the interference-power estimation circuitry, measuring a carrier power to noise ratio by using the desired signal power and the second noise power.

12. A control circuit for controlling a reception device, the control circuit that causes the reception device to
extract a symbol from a received signal with a first signal inserted in a time direction of a data symbol, the first signal being a signal with a value of amplitude smaller than that of the data symbol and the symbol being a signal during an interval corresponding to the first signal, and perform a signal interpolation process to reproduce an interference signal during an interval corresponding to the data symbol,
output a first interference-cancelled signal obtained by extracting the data symbol from a signal obtained by cancelling the interference signal from the received signal,
estimate desired signal power by subtracting second average power of a symbol of a first signal, extracted from the received signal, from first average power of a data symbol extracted from the received signal, and estimate first noise power included in the first interference-cancelled signal by subtracting the desired signal power from third average power of a data symbol of the first interference-cancelled signal, estimate second noise power included in the received signal from the first noise power, and estimate interference power by subtracting the second noise power from the second average power.

13. A non-transitory computer-readable recording medium that stores therein a program for controlling a reception device, the program that causes the reception device to extract a symbol from a received signal with a first signal inserted in a time direction of a data symbol, the first signal being a signal with a value of amplitude smaller than that of the data symbol and the symbol being a signal during an interval corresponding to the first signal, and perform a signal interpolation process to reproduce an interference signal during an interval corresponding to the data symbol, output a first interference-cancelled signal obtained by extracting the data symbol from a signal obtained by cancelling the interference signal from the received signal, estimate desired signal power by subtracting second average power of a symbol of a first signal, extracted from the received signal, from first average power of a data symbol extracted from the received signal, and estimate first noise power included in the first interference-cancelled signal by subtracting the desired signal power from third average power of a data symbol of the first interference-cancelled signal, estimate second noise power included in the received signal from the first noise power, and estimate interference power by subtracting the second noise power from the second average power.

* * * * *